United States Patent
Venom et al.

(10) Patent No.: US 9,159,372 B2
(45) Date of Patent: Oct. 13, 2015

(54) HOUSING FOR RECEIVING A REMOVABLE HARD DISK, INCLUDING A TILTING CAM FOR REMOVING SAID HARD DISK

(75) Inventors: Didier Venom, Rueil Malmaison (FR); Dominique Susini, Rueil Malmaison (FR); Grégory Sonjon, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 238 days.

(21) Appl. No.: 13/378,604

(22) PCT Filed: Jul. 21, 2010

(86) PCT No.: PCT/EP2010/060551
§ 371 (c)(1),
(2), (4) Date: Dec. 15, 2011

(87) PCT Pub. No.: WO2011/012514
PCT Pub. Date: Feb. 3, 2011

(65) Prior Publication Data
US 2012/0104911 A1    May 3, 2012

(30) Foreign Application Priority Data
Jul. 27, 2009  (FR) ...................................... 09 03677

(51) Int. Cl.
*G11B 33/12*  (2006.01)
(52) U.S. Cl.
CPC ............ *G11B 33/123* (2013.01); *G11B 33/124* (2013.01)
(58) Field of Classification Search
CPC ..................................................... G11B 33/123
USPC ................................................. 439/157, 159
See application file for complete search history.

(56) References Cited

U.S. PATENT DOCUMENTS

| | | | | |
|---|---|---|---|---|
| 5,161,989 A | * | 11/1992 | Okubo et al. | 439/159 |
| RE35,938 E | * | 10/1998 | O'Brien et al. | 439/160 |
| 5,967,811 A | * | 10/1999 | Yamamoto et al. | 439/159 |
| 6,022,228 A | * | 2/2000 | Kuo | 439/159 |
| 6,059,588 A | | 5/2000 | Tung et al. | |
| 6,106,313 A | * | 8/2000 | Chen | 439/159 |
| 6,234,813 B1 | * | 5/2001 | Hanyu | 439/159 |
| 6,361,339 B1 | * | 3/2002 | Zhang et al. | 439/160 |
| 6,482,030 B1 | * | 11/2002 | Kuo | 439/541.5 |
| 6,619,971 B1 | * | 9/2003 | Chen | 439/159 |

(Continued)

FOREIGN PATENT DOCUMENTS

WO    WO 95/10129 A1    4/1995

*Primary Examiner* — Daniel Wiley
(74) *Attorney, Agent, or Firm* — Muncy, Geissler, Olds & Lowe, P.C.

(57) ABSTRACT

A box is provided for receiving a removable element. The box is a generally rectangular box fitted with a tilting cam of cut-out sheet metal situated in the rear portion of the box body, the tilting cam having an actuation end and an ejection end situated on either side of a central portion of said cam for the purpose of ejecting the removable element when the cam is tilted about its central portion. The box body has in the rear portion of its top face a tab including a base extended by a tongue that extends parallel to said top face while being spaced apart from said top face, together with a lug projecting from the top face and situated facing a free end of the tongue. The tilting cam is secured to the box body by snap-fastening, having its central portion engaged firstly between the tongue and the top face of the box body, and secondly between the lug and the base.

4 Claims, 2 Drawing Sheets

(56) References Cited

U.S. PATENT DOCUMENTS

| | | | |
|---|---|---|---|
| 7,014,118 B1 * | 3/2006 | Ramey et al. | 235/486 |
| 7,295,447 B2 * | 11/2007 | Strmiska et al. | 361/798 |
| 2005/0148221 A1 * | 7/2005 | Miyamoto | 439/157 |
| 2012/0220146 A1 * | 8/2012 | Yokoyama et al. | 439/159 |

* cited by examiner

HOUSING FOR RECEIVING A REMOVABLE HARD DISK, INCLUDING A TILTING CAM FOR REMOVING SAID HARD DISK

The invention relates to a box for receiving a removable element such as a removable hard disk, the box having an open front face in which the removable hard disk is engaged, and also having a movable member that is actuatable in order partially to remove a disk engaged in said box so as to enable a user to take hold of the front portion of the hard disk and remove it completely.

BACKGROUND OF THE INVENTION

In practice, an internal electronic connector is situated in the rear portion of such a box when the assembly is mounted, e.g. on a printed circuit. When the user engages a hard disk in the box, pressure is exerted on the front portion of the box so that a complementary connector situated on the rear portion of the hard disk engages in the internal connector situated at the rear face of the box.

Thus, once the hard disk is in place in the box, the connectors are fully engaged one in the other such that the removable hard disk is operational and can therefore be controlled by the operating system associated with the printed circuit of the box.

Given the mutual engagement required between the connectors when the hard disk is in place, it is necessary to exert a pressure force from the rear of the box against the hard disk in order to enable the connectors to be separated from each other, thereby initiating removal of the hard disk.

Typically, this force is provided by means of a cam that is mounted to tilt on the box and that has an ejection end bearing against the end of the hard disk when the cam is actuated. The force exerted by the ejection end enables the connectors to be separated and enables the hard disk to be removed in part so as to allow the user to take hold of its front portion, which then projects from the front face of the box.

In practice, such a box, which is generally in the form of a rectangular parallelepiped, is made from sheet metal elements that are cut out, stamped, folded, and connected to one another.

Specifically, mounting the tilting cam, which is itself an element made of sheet metal, thus requires a hole or the like to be provided in the cam, and requires it to be fastened to the box body by means of the hole so as to secure it to the box body, while leaving it free to pivot relative thereto in order to enable it to be actuated to eject the hard disk.

Such mounting generally requires several thicknesses of sheet metal to be provided in the region of the box that carries the tilting cam, so that a rivet can be secured rigidly to the box body, and thus constitute a pivot pin that is rigidly secured to the box and about which the cam can pivot.

OBJECT OF THE INVENTION

The object of the invention is to propose a solution for simplifying the mounting of a tilting cam so as to reduce the cost of fabricating the box as a whole.

SUMMARY OF THE INVENTION

To this end, the invention provides a box for receiving a removable element, the box comprising a box body generally in the form of a rectangular parallelepiped and fitted with a tilting cam of cut-out sheet metal situated in the rear portion of the box body, the tilting cam having an actuation end and an ejection end situated on either side of a central portion of said cam for the purpose of ejecting the removable element when the cam is tilted about its central portion, wherein the box body has in the rear portion of its top face a tab including a base extended by a tongue that extends parallel to said top face while being spaced apart from said top face, together with a lug projecting from the top face and situated facing a free end of the tongue, the tilting cam being secured to the box body by snap-fastening, having its central portion engaged firstly between the tongue and the top face of the box body, and secondly between the lug and the base.

With this solution, there is no need to provide a stationary pin rigidly secured to the box body. The box body may be fabricated out of molded plastics material so as to include the tab and the lug in the rear portion of its top face. It may also be fabricated out of sheet metal that has been cut out and stamped, with the tab then being formed by a U-shaped pre-cut that is subsequently stamped so that it extends parallel to the top face of the box while being spaced apart therefrom, the lug then being obtained in analogous manner.

The invention also provides a box as defined above, wherein the lug has a face directed away from the free end of the tongue and inclined relative to the top face of the box body to constitute a ramp facilitating engagement of the cam between the tongue and the top face.

The invention also provides a box as defined above, further comprising a lever of stamped sheet metal slidably mounted along a side face of the box body, the lever having an end forming a pushbutton and terminating at the front face of the box body, and another end connected to the actuation end of the cam in order to cause said cam to tilt by pushing against the pushbutton-forming end.

The invention also provides a box as defined above, wherein the box body includes two tabs in its rear portion, which tabs extend parallel to said top face, and two lugs each projecting from said top face and each situated facing one of the tabs, the tabs being arranged on either side of a general plane of symmetry of the box body, and the lugs being arranged on either side of a general plane of symmetry of the box.

The invention also provides a box as defined above, wherein the box body includes guide elements for guiding a lever, and enabling the lever to be slidably mounted either along one side face of the box body, or else along another side face of the box body.

DETAILED DESCRIPTION OF THE INVENTION

Figure 1:
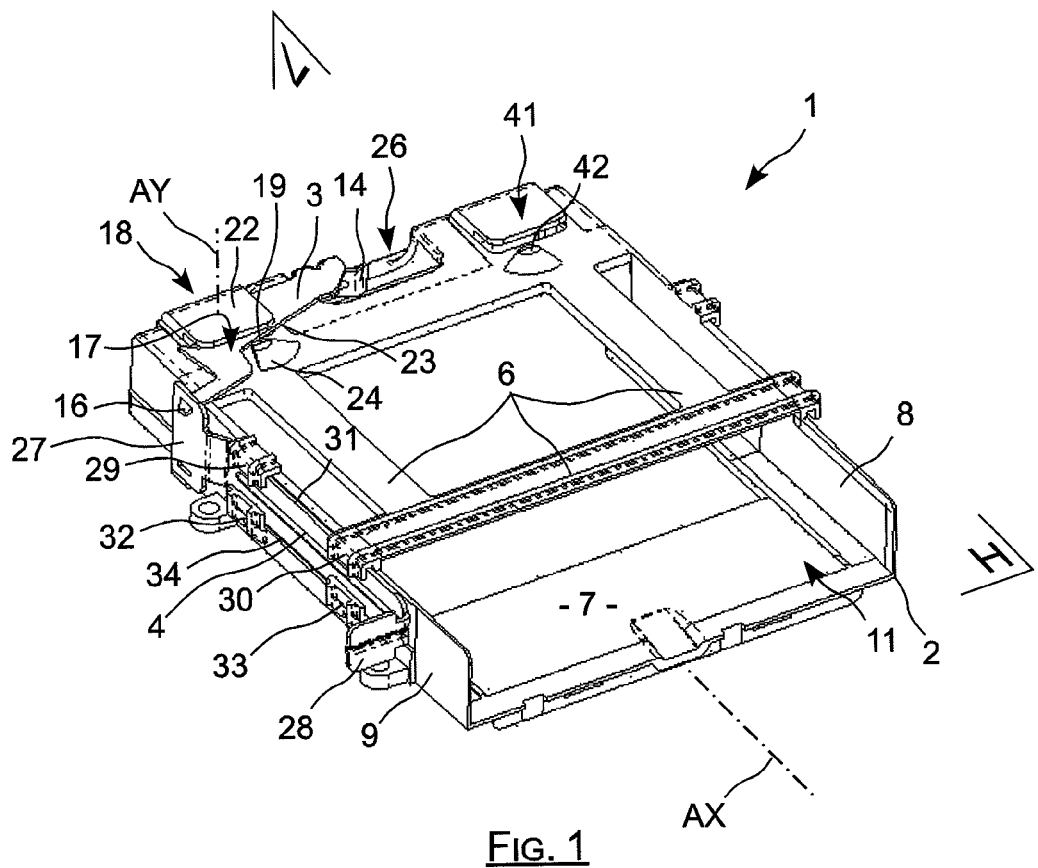
FIG. 1 is a perspective view showing the top face together with the front face and the left side face of the box body of the invention together with the tilting cam mounted on its rear portion and the actuator lever mounted on its left side face.

The box of the invention is referenced 1 in the figures and comprises a box body of plastics material obtained by molding and referenced 2, which body is fitted with a tilting cam 3 and an actuator lever 4.

The box body 2, which is generally in the form of a rectangular parallelepiped, has a perforated top wall or face referenced 6, a bottom wall or face that is likewise perforated and referenced 7, right and left side walls or faces respectively referenced 8 and 9, together with a front face 11 that is completely open, and a rear wall or face 12.

The box body 2 is designed to receive a removable element (not shown), which in the application example shown in the figures is a removable hard disk. Engaging the hard disk, which is itself likewise generally in the shape of a rectangular parallelepiped, consists in placing it in register with the open front face 11 and causing it to slide into the box 1 until it comes to bear against the rear wall 12 of the box body.

The removable hard disk is engaged by moving it along the longitudinal direction AX of the box, this direction coinciding with an axis parallel to the side and top faces of the box.

Specifically, an electronic connector (not visible in the figures) having sockets oriented in the direction AX is situated in the rear wall 12 to receive the pins of the corresponding connector fitted to the removable hard disk, with this taking place when the disk is pushed fully home into the box.

In practice, the engagement of the pins of the hard disk connector in the corresponding sockets situated in the rear wall 12 itself suffices to ensure that the hard disk is held in the box. The hard disk is removed by exerting a thrust force on the rear face of the removable hard disk, which force is oriented along the direction AX towards the front face 11.

This thrust force is exerted by the tilting cam 3 that is situated in the rear portion of the box 1 and that includes an end that comes to bear against the rear face of the removable hard disk when the cam tilts.

The tilting cam 3 is made of sheet metal cut to the general shape of an arm or the like, presenting an actuation end 16 of pointed shape enabling it to be actuated so as to tilt, and an ejector end 14 whereby it exerts a thrust force on the removable disk in order to eject it on being tilted.

As can be seen in FIG. 1, the cam 3 has a central portion 17 situated between its ends 14 and 16, and about which it tilts between a rest position and a tilted position. The rest position corresponds to the position occupied by the cam in the figures, and the tilted position corresponds to the position that the cam occupies in order to eject the removable hard disk, at least in order to disconnect it from the electronic connector in the rear wall 12 of the box 1.

Figure 2:
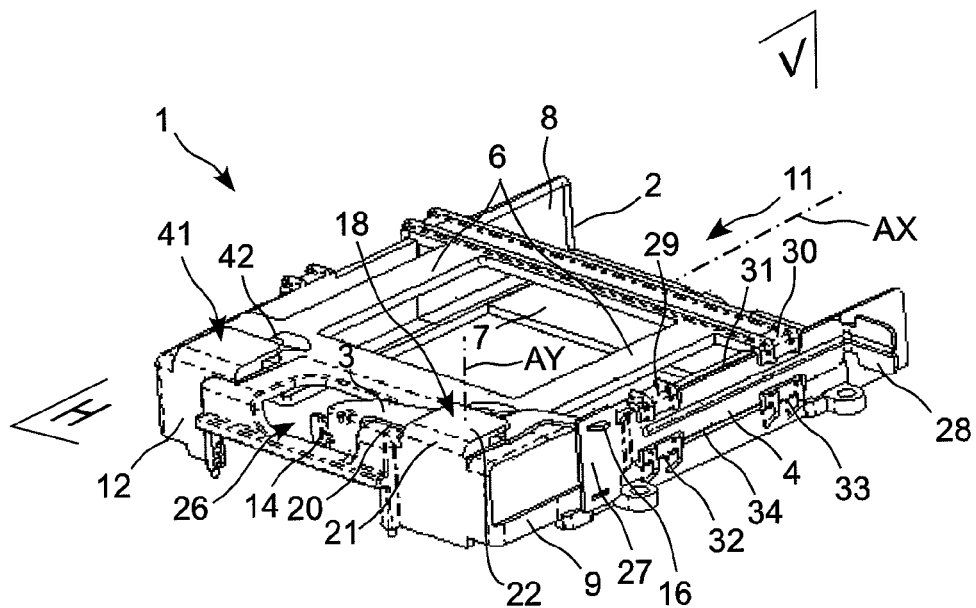
FIG. 2 is a perspective view showing the top face together with the rear face and the left side face of the box of the invention together with the tilting cam mounted on its rear portion and the actuator lever mounted on its left side face.

In FIGS. 1 and 2, an axis referenced AY is shown symbolically, which axis extends perpendicularly to the top face 6 and is situated level with the central portion 17 of the cam 3, with the cam pivoting about this axis when it is actuated.

The cam 3 is secured to the box body 2 by means of a tab 18 and a lug 19, while being suitable for pivoting relative thereto. The tab 18 has a base 21 that extends perpendicularly to the top face 6, in line with the rear wall 12, and it is itself extended by a generally plane tongue 22. The tongue 22 extends parallel to the top face 6 while being spaced apart from said face by a distance that corresponds substantially to the thickness of the metal sheet constituting the cam 3 in its central portion 17.

The lug 19 projects beyond the top face 6, while being situated facing the free end of the tongue 22. It is of a height that corresponds substantially to the distance between the tongue 22 and the top face 6, and it is spaced apart from the free end of the tongue 22.

The cam 3 is assembled to the rear portion of the box body 2 merely by snap-fastening. The edge 20 of the central portion 17 of the cam 3 is then engaged between the free end of the tongue 22 and the top face 6 of the body of the box, this central portion 17 then having its bottom face bearing against the free end of the lug 19. A force is then exerted on the cam 3 in the direction AX in order to bring the central portion 17 of the cam 3 towards the base 21 of the tab 18.

Under the effect of this snap-fastening force applied to the cam 3, the tongue 22 bends to open by moving away from the top face 6, thereby enabling the cam to advance towards the base 21, while having its bottom face bearing against the lug 19. At the end of this movement, the central portion 17 of the cam is housed bearing against the top face 6, while the opposite edge 23 of the central portion 17 comes level with the lug 19 and slides along the lug 19 towards the top face 6 under the effect of the bending forces applied by the tongue 22 to said central portion 17.

At this stage, the cam 3 is fully snap-fastened in its housing, i.e. its assembly is substantially terminated. As can be seen in the figures, when the cam 3 is snap-fastened, it bears via its bottom face against the top face 6 of the box body, and the bottom face of the tongue 22 bears against the top face of the cam.

In addition, the cam 3 is also blocked longitudinally, i.e. in the direction AX, firstly by the base 21 of the tab 18 that constitutes an abutment against the edge 20 of the central portion 17 of said cam 3, and secondly by the lug 19, which constitutes an abutment against the opposite edge 23 of said central portion 17.

The base 21 of the tab 18 may advantageously be provided with an internal peg or abutment (not shown in the figures) that provides a semicylindrical surface of axis AY, against which the edge 20 of the central portion 17 comes to bear, in particular while the cam 3 is tilting.

Furthermore, the lug 19 has a face facing towards the free end of the tongue 22, which face is generally semicylindrical or the like in shape so as to constitute an abutment against the edge 23 of the central portion 17.

Concerning the face of the lug 19 that faces away from the free end of the tongue 22, which face is referenced 24, it presents on the contrary the shape of a portion of a conical sector extending from the top face 6 of the box body to the end of said lug 19.

This face 24 thus constitutes a ramp that facilitates engagement of the cam 3 between the tongue 22 and the top face 6 while the cam 3 is being snap-fastened. In particular, it ensures that during said engagement, the lug 19 does not constitute an obstacle opposing movement of the cam.

The cam 3 thus has its central portion held parallel to the top face 6, and it is suitable for pivoting about its central portion 17. The ejection end 14 of the cam 3 is a portion that is folded relative to the central portion 17, and that is engaged in a recess 26 extending in the central portion of the rear wall 12 and of the rear portion of the top face of the box body. This recess 26 presents dimensions that are greater than the dimensions of the ejection end so as to leave it free to move, enabling it to bear against the rear face of a removable hard disk engaged in the box.

In general manner, the transverse position of the tilting cam 3 is stable, i.e. since the forces that are applied to the cam 3 are longitudinal forces, they do not tend to move it transversely relative to the box body. Furthermore, its freedom to move transversely is limited by the recess 26 within which the ejection end 14 is engaged.

In addition, other means may be provided to avoid the cam 3 being blocked transversely, should that be necessary. These means may comprise a recess in the edge 23 of the cam 3 suitable for partially surrounding the lug 19 when the cam is in place. They may also include an analogous recess in the edge 20 of the cam so as to partially surround the base of the tab when the cam 3 is in place.

The hard disk is ejected by exerting a force on the actuation end 16 of the cam 3, the force being directed along the axis AX towards the rear face 12 so as to cause the cam 3 to tilt and thus act via the ejection end 14 to exert a force on the rear face of the removable disk and towards the front face 11.

The actuation end 16 of the cam is moved by means of a lever 4 that is mounted to slide along the left side wall 9 and that has an actuation end 27 situated at the actuation end 16 of the cam 3 and an opposite end 28 constituting a pushbutton that is situated close to the front face 11 of the box.

The lever is made of generally rectangular sheet metal that is cut and stamped or folded, and it slides along the side wall 9 while extending parallel to the axis AX. The lever 4 forms a slider and it is secured to the box body by two curved top tabs 29 and 30 that engage the top edge 31 of the box body, and by two curved bottom tabs 32 and 33 that engage the bottom edge 34 of the box body so as to hold the entire lever against the outside face of said left side wall 9.

As can be seen in the figures, the actuation end 27 of the lever 4 has a top opening or hole and a bottom opening or hole. When the lever is mounted on the left, as in FIGS. 1 and 2, the actuation end 16 of the cam 3 is engaged in the top hole of the end 27 of the lever, so as to be dynamically linked to the lever.

Additionally, a return spring (not shown) continuously biases the lever 4 towards its rest position, which corresponds to the position it occupies in FIGS. 1 and 2, in which position the cam 3 is not tilted.

When a user exerts a force on the end 28 of the lever, acting as a pushbutton, in order to push the lever 4 towards the rear wall 12, this acts against the return spring (not shown) to cause the cam 3 to tilt in order to eject the removable hard disk.

When the user releases the end 28, the lever is returned towards its rest position by the return spring, and it takes with it the actuation end 16 of the cam 3, thereby having the effect of returning the cam likewise towards its rest position.

As can be seen in the figures, the box as a whole is generally symmetrical about a vertical midplane parallel to the side walls 8 and 9 and halfway between them. Furthermore, the lever is also symmetrical about a horizontal plane H parallel to its top and bottom faces 6 and 7 and lying halfway between those faces.

Figure 3:
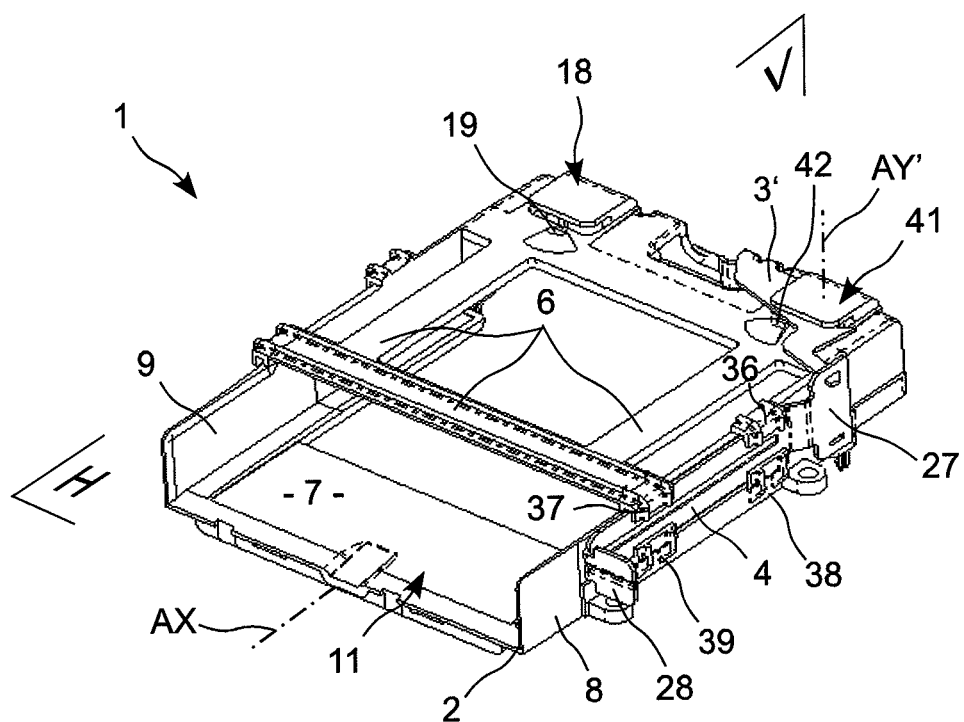
FIG. 3 is a perspective view showing the top face together with the front face and the right side face of the box of the invention, together with the tilting cam mounted on its rear portion and the actuator lever mounted on its right side face.

By means of these symmetries, the lever 4 can thus be mounted to slide, as appropriate, along the left side wall 9, as shown in FIGS. 1 and 2, or else along the right side wall 8, as shown in FIG. 3, thereby making the box adaptable and in practice enabling the ejection pushbutton to be placed either on the right of the front face 11 or on the left of the front face.

Thus, in the example of FIG. 3, the lever 4 is mounted to slide along the right wall 8, being retained along said wall by four tabs referenced 36-39, which tabs are symmetrical to the tabs 29, 30, 32, 33 relative to the plane V. As can be seen in the figures, the lever 4 then occupies a position that is symmetrical to the position it occupies in the configuration of FIGS. 1 and 2.

In this other configuration, the cam used, which is referenced 3', is a part that is by construction symmetrical to the cam 3 of FIGS. 1 and 2, e.g. relative to the plane of symmetry V.

The cam 3' is likewise installed by snap-fastening, in the housing defined by another tab 41 and by another lug 42. As can be seen in the figures, the tab 41 is symmetrical to the tab 18 relative to the plane V, and the lug 42 is symmetrical to the lug 19 relative to the plane V.

As when mounted on the left, the actuation end of the cam is engaged in the top hole of the actuation end 27 of the lever 4.

When the lever 4 is mounted on the right, as in FIG. 3, it is turned through half a turn about the axis AX relative to its configuration when mounted on the left, as shown in FIGS. 1 and 2. Thus, when mounted on the right, the top hole in the actuation end 27 is the hole that occupies the bottom position in the left-mounted configuration.

What is claimed is:

1. A box for receiving a removable element, the box comprising:
    a box body generally in the form of a rectangular parallelepiped, the box body comprising:
        opposing top and bottom walls;
        opposing side walls connecting the top and bottom walls;
        a rear wall having a recess formed through a portion thereof; and
        an open front face opposite the rear wall, the open front face defining an opening for insertion of the removable element into the interior of the box body;
    a tab formed on an outer surface of the top wall adjacent the rear wall, the tab including:
        a base extending vertically from the outer surface; and
        a resilient tongue formed at a top of the base that extends toward said open front face and generally parallel to said top wall, the tongue terminating in a free end;
    a lug projecting vertically from the outer surface of the top wall adjacent the free end of the tongue, the lug comprising:
        a rear end facing the free end of the tongue such that the rear end of the lug, the base, the tongue, and the outer surface together define a pivot space therebetween, and
        a front end, the front end comprising an inclined face extending from a top surface of the lug down to the outer surface in a direction generally towards the open front face; and
    a tilting cam movably secured to the box body for ejecting the removable element from the box, the tilting cam comprising:
        an actuation end extending towards a first side wall of the two side walls of the box body, the actuation end configured to be manipulated by an end user;
        an ejection end opposite the actuation end and extending at least partially into the recess in the rear wall and configured to engage a rear surface of the removable element; and
        a central portion between the actuation end and the ejection end, the central portion configured to slidingly pivot about a vertical axis within the pivot space,
        wherein the tilting cam is secured within the pivot space by sliding the central portion over the inclined face of the lug into flexible engagement under the resilient tongue, until the central portion snaps into the pivot space.

2. The box according to claim 1, further comprising a lever slidably mounted along the first side wall, the lever having an end forming a pushbutton and terminating at the front face of the box body, and another end connected to the actuation end of the cam in order to cause said cam to tilt by pushing against the pushbutton-forming end.

3. The box according to claim 1, wherein the box body includes two tabs in its rear portion, which tabs extend parallel to said top wall, and two lugs each projecting from said outer surface and each situated facing one of the tabs, the tabs being arranged on either side of a general plane of symmetry of the box body, and the lugs being arranged on either side of a general plane of symmetry of the box.

4. The box according to claim 2, wherein the box body includes two tabs in its rear portion, which tabs extend parallel to said top wall, and two lugs each projecting from said outer surface and each situated facing one of the tabs, the tabs being arranged on either side of a general plane of symmetry of the box body, and the lugs being arranged on either side of a general plane of symmetry of the box, and wherein the box body includes guide elements for guiding the lever, and enabling the lever to be slidably mounted either along one side face of the box body, or else along another side face of the box body.

\* \* \* \* \*